United States Patent [19]

Kemp

[11] 4,150,607
[45] Apr. 24, 1979

[54] COFFEEMAKER GENERATOR MOUNTING

[75] Inventor: Charles L. Kemp, Asheboro, N.C.

[73] Assignee: General Electric Company, Bridgeport, Conn.

[21] Appl. No.: 906,861

[22] Filed: May 17, 1978

[51] Int. Cl.² ............................................. A23F 1/00
[52] U.S. Cl. ..................................... 99/279; 219/336
[58] Field of Search ............................. 99/279–288, 99/304–306; 126/344, 345, 348; 219/280, 281, 335, 336

[56] References Cited

U.S. PATENT DOCUMENTS

| | | | |
|---|---|---|---|
| 2,711,727 | 6/1955 | Albano | 126/350 |
| 3,303,327 | 2/1967 | Himelsbaugh | 219/544 |
| 3,681,568 | 8/1972 | Schaefer | 219/432 |
| 3,968,740 | 7/1976 | Brown | 99/289 R |
| 4,000,396 | 12/1976 | Abel, Jr. | 219/314 |
| 4,033,248 | 7/1977 | DiSalino | 99/281 |
| 4,069,750 | 1/1978 | Kemp | 99/280 |

*Primary Examiner*—Leonard D. Christian
*Attorney, Agent, or Firm*—John F. Cullen; George R. Powers; Leonard J. Platt

[57] ABSTRACT

In a conventional plastic drip coffeemaker, an improvement is provided for mounting the hot water generator comprising a single plastic molded box-shaped housing having an access opening only at one end and the other end and side walls being integrally formed. Spaced ribs are molded on and extend along a side wall towards the opening and terminate inside of the opening. A molded-in boss for securement is provided on the opposite side wall and a U-shaped channel member crosses the access opening with its legs directed inwardly of the housing to straddle in fixed abutment against the ribs at one edge and fixed to the boss at the opposite edge. The hot water generator is secured to the channel inside the opening so that the generator is fixed against all lateral movement by the straddling channel and against movement into the opening by abutment against the ribs. A cover is provided with biasing structure so that, as the cover is latched in position it levers the channel against the ribs to preclude outward movement and lock the hot water generator against movement in all directions.

5 Claims, 2 Drawing Figures

COFFEEMAKER GENERATOR MOUNTING

BACKGROUND OF THE INVENTION

1. Field of the Invention

The invention relates to an electric drip coffeemaker of the molded plastic housing type having an access opening only at one end and is directed to an improved mounting for securing the hot water generator against movement in all directions with substantially a single channel mount.

2. Description of the Prior Art

Drip brewing apparatus for coffee and like beverages is well known. In electric drip coffeemakers, it is usual to provide a molded plastic housing, such as polypropylene, of a general C-shape having a lower horizontal base for holding a receptacle such as a glass carafe, a generally vertical wall integrally molded with the base, and a forwardly extending overhanging top wall located above the carafe for holding a coffee brew basket. The basket is filled with dry ground coffee and then positioned on the underside of the top wall of the housing. A water reservoir is supplied generally in the vertical wall and an electric heater in the form of a hot water generator in the plastic base delivers heated water through an opening in the top wall of the housing and into the coffee brew basket so the hot water flows through the grounds and brewed coffee drips into the carafe. The conventional base heater may perform dual functions of supplying the pumping action from the generator to heat and move the water through its cycle as well as keeping the brewed coffee hot in the carafe. Usually the parts are made of molded plastic as much as feasible and as molding techniques and aesthetics permit. The top and bottom of the C-shape may be two separate moldings suitably joined along a parting line. With the molded housing access is normally provided through only one lower open end and through this all of the internal structure may be securely mounted. It is also necessary to provide mountings for the internal parts that do not cause sink marks on the outside surface or warpage problems because of the long draw in the molding techniques such as occur with low-cost plastics like polypropylene. A typical coffeemaker of this general type showing a timer mount is U.S. Pat. No. 4,069,750 of a common assignment. The present invention is concerned with the means for securely mounting the hot water generator within such a coffeemaker and doing it with substantially a single part while providing for a secure mounting through only one access opening.

SUMMARY OF THE INVENTION

Briefly described, the invention is directed to an electric brewer for coffee and like beverages that has a heated base supporting a receptacle and has a hot water generator with means to store and direct water from the generator to the receptacle. To this, an improvement is provided for mounting the generator comprising a single plastic molded box-shaped housing with an access opening only at one end and with the other end and side walls being formed as an integral molding. Spaced rib means are formed on and extended along a side wall towards the access opening and terminate within the opening. Securing means in the form of a boss are molded on the opposite side wall. Crossing the access opening is a single U-shaped channel member having its legs directed into the opening so that it straddles in fixed abutment against the ribs at one edge and connects to the securing means at the opposite edge fixing the channel against all lateral movement and any movement into the opening. The hot water generator is then secured to the channel within the opening. A cover may be provided for the access opening with biasing means on the cover to operate on the channel and lever it firmly into the opening when the cover is closed so that the single channel-supported generator is firmly locked against movement in all directions when the cover is in position. Thus, the main object is to provide a coffeemaker with an improved generator mounting that uses no extra parts, is adaptable to a polypropylene molded coffeemaker housing, avoids any warpage or sink problems with the plastic, and locks the generator firmly in position with no extra parts in an opening normally accessible only axially from one open end.

DESCRIPTION OF THE PREFERRED EMBODIMENT

Figure 1:
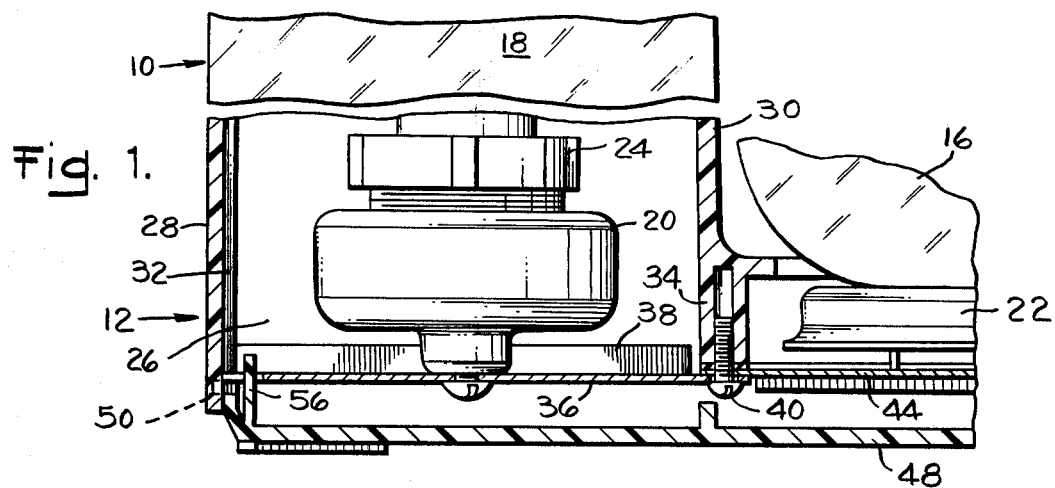
FIG. 1 is a partial section of a coffeemaker housing showing the generator mount and other components to illustrate the environment.

The invention will be described in connection with an electric drip coffeemaker although it is useful for other drip beverages as will be apparent. Referring to FIG. 1, there is shown an electric drip coffeemaker of the general type as said U.S. Pat. No. 4,069,750 patent comprising upper housing 10 and lower base housing 12, secured along a suitable parting line in conventional fashion. Each housing is an individual single mold of plastic materal such as polypropylene. Lower housing 12 includes an integral base supporting a receptacle or carafe 16 below a coffee basket not shown into which hot water is pumped to deliver brewed coffee to receptacle 16 in a known manner. To store water, a reservoir 18 is provided and a common hot water generator 20, as in co-pending application Ser. No. 857,210 filed Dec. 5, 1977, of common assignment, heats and directs the water through the coffee basket into the carafe 16 as brewed coffee where it is maintained warm by a hot plate assembly 22. The portion above generator 20 requiring conventional tubing and electrical connections may be supported by coupling 24 all in known fashion and forming no part of the present invention.

Figure 2:
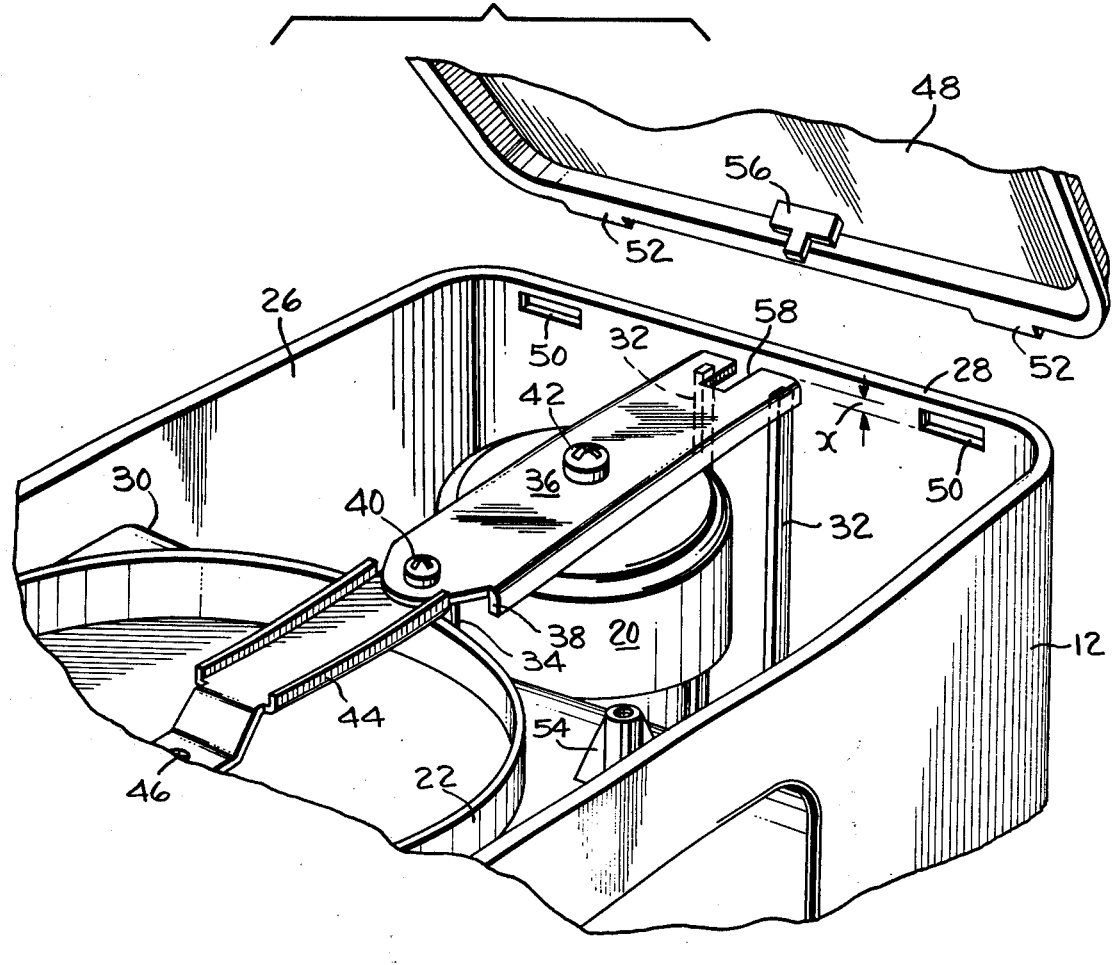
FIG. 2 is an exploded bottom partial perspective of the parts in FIG. 1 showing the single channel generator mount.

For cost, economy, and appearance, the entire lower base housing 12 is formed as a single integral molded part of suitable plastic, such as polypropylene and comprising a box-shaped housing as shown at 12 with only a single end opening 26 to the box axially accessible from below as seen in FIG. 2. In other words, housing 12 is a closed box with a lower flap missing. Thus, the access opening is only at one end 26 and the other end and side walls 28 and 30 are all integrally formed. Consequently, all internal structure must be inserted through the single lower access opening 26 while maintaining the aesthetic appearance necessary with a plastic housing by allowing no sink or warpage marks on the exterior as commonly occurs in molded parts.

In accordance with the invention, it is desired to mount hot water generator 20 through the only access opening 26 and mount is securely with as few parts as possible and use the full extent of molding techniques in the single housing 12. To this end, spaced ribs 32 are formed directly on and extend vertically along side wall 28 to extend towards and terminate inside the end of access opening 26. In other words, the ribs terminate just below the outlet as shown in FIG. 2. To cooperate with these ribs, a molded-in boss 34 is formed directly in the opposite wall 30 for a purpose to be described. For securing the hot water generator 20, a U-shaped channel member 36 is provided to span or extend across opening 26 and is disposed with its legs 38 directed into the opening. Channel 36 straddles ribs 32 and nests thereon in fixed abutment against the ribs at one edge of the channel and the other edge is suitably secured by screw 40 in boss 34. Thus, the arrangement is such that the single channel 36 cooperating ribs 32 and boss 34 fix the generator, which is secured to the channel 36 by screw 42, against all lateral movement and any movement into the housing or opening 26. Thus, the single channel 36 cooperating with the molded-in ribs and boss provides a firm locating fix for hot water generator 20. Another channel 44 or the like may extend outward as shown in FIG. 2 and fasten at 46 to the center of hot plate assembly 22 to hold it in position.

To close access opening 26 and limit outward movement of channel 36 out of the opening, a suitable cover 48 of similar molded plastic is provided. The cover is designed to be a hinge-like structure wherein the side wall 28 has spaced grooves 50 on each side of channel 36 with the grooves being adjacent the edge of access opening 26 as shown in FIG. 2. Cooperating with the grooves 50 are matching tongues 52 integrally molded on cover 48 so that tongues 52 are inserted in grooves 50 and the cover rotated to closed position as shown in FIG. 1 and secured at any of a number of spaced molded screw hole bosses 54. For locking the parts further, a central biasing means in the form of a molded shouldered T-shaped projection 56 extends through an aperture 58 on the centerline of the channel so the shoulders of projection 56 abut directly on the channel surface with the center tab extending through the aperture in a tongue and groove fashion as clearly seen in FIG. 2. For a tight and secure fitting, the spacing of tongue and groove parts 52 and 50 may be slightly inward of the opening and below the surface of channel 36 so that a moment arm or lever action is created by the offset X tightening projection 56 shoulders abutting the channel against the ribs to securely lock the channel against outward and sideward movement of the opening when the cover is closed. Alternatively, projection 56 may be long enough to force a similar lever biasing action against channel 36 when the cover is rotated about the tongue and groove 52/50 hinges for securement to base 12. In either case, channel 36 is forced tightly against ribs 32 to prevent any channel outward movement from opening 26 to complete the fixing of the channel and attached generator against all lateral and vertical movement.

Thus, the invention provides an essentially single channel element 36 mount cooperating with molded in grooves and bosses to hold all the internal structure securely against movement in all directions when the supporting hot water generator is screwed to the channel. This securement is enhanced by the lever action of the cover and its biasing means 56 to prevent any outward movement resulting in a simple, inexpensive, essentially one-part support adaptable to easy assembly in a plastic housing having an access opening only at one end.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. An electric brewer for coffee and like beverages including a heated base supporting a receptacle and hot water generator, means to store and direct water from said generator to said receptacle, an improvement for mounting said generator comprising, a single plastic molded box-shaped housing with an access opening only at one end with the other end and side walls being integrally formed, spaced rib means formed on and extending along a side wall towards and terminating within said opening, securing means on the opposite side wall, a U-shaped channel member crossing said opening with its legs directed therein, said member straddling in fixed abutment against said ribs at one edge and connected to said securing means at the opposite edge, and means securing said generator to said channel within the opening to fix said generator against all lateral movement and movement into said opening.

2. Apparatus as described in claim 1 wherein said securing means on the opposite side wall is a molded-in boss and, screw means extending through said channel into said boss fixing said opposite channel edge to said boss.

3. Apparatus as described in claims 1 or 2 having cover means for said opening, biasing means on said cover extending towards said opening and aligned on said channel centerline, and means securing said cover to said base whereby said biasing means abuts said channel preventing outward movement so the channel and supported generator are locked against all lateral and vertical movement.

4. Apparatus as described in claim 3 wherein said ribbed side wall has groove means on each side of said channel adjacent the edge of said access opening, matching tongue means on said cover, said tongue and groove means disposed in relation to said biasing means to create a lever biasing action thereon when the cover is rotated about said tongues and grooves for securement to said base.

5. Apparatus as described in claim 4 wherein said biasing means comprises, a centerline-disposed aperture through said channel, and a shouldered projection on said cover extending through said aperture with the shoulders abutting said channel against said ribs fixing the channel against outward movement from said opening.

* * * * *